March 24, 1953 — E. A. GOLDBERG — 2,632,845
COINCIDENCE INDICATOR
Filed Dec. 22, 1950
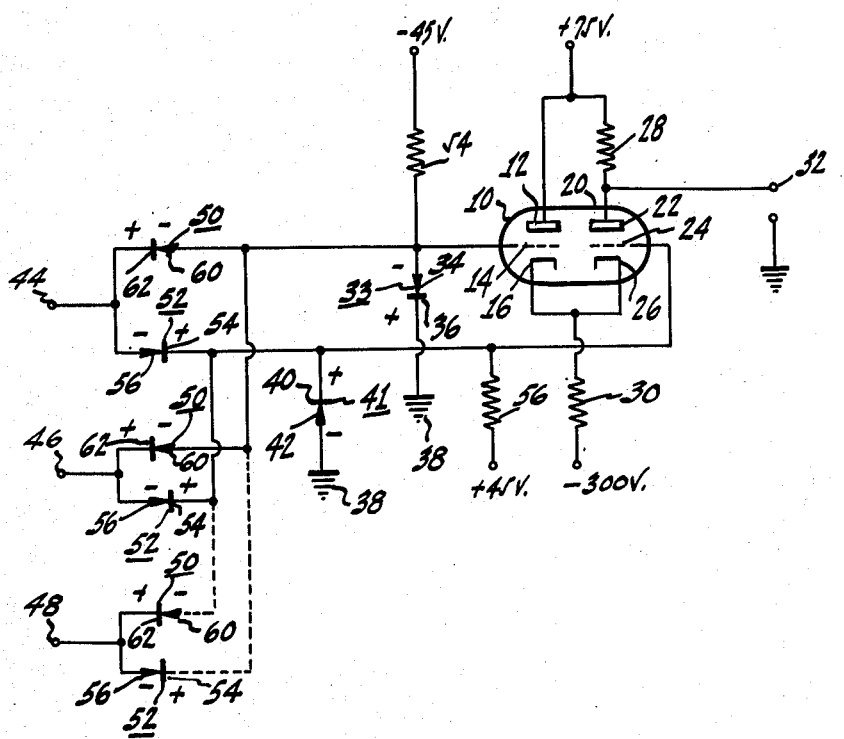
INVENTOR.
EDWIN A. GOLDBERG
BY
ATTORNEY Patented Mar. 24, 1953

2,632,845

UNITED STATES PATENT OFFICE 2,632,845

COINCIDENCE INDICATOR

Edwin A. Goldberg, Princeton Junction, N. J., assignor to Radio Corporation of America, a corporation of Delaware Application December 22, 1950, Serial No. 202,349

4 Claims. (Cl. 250—27)

This invention relates to control circuits and more particularly is an improvement in voltage coincidence sensing systems.

Systems for detecting a coincidence in the amplitude of several voltages find a great number of applications in widely diversified fields. In the industrial control field, for example, sample voltages may be compared with standard voltages for the purpose of initiating control operations when voltage coincidence is reached. Sample voltages may be compared with each other for the same purpose. Coincidence sensing systems find a similar application in the telemetering field. In the field of computers, coincidence sensing devices may find application as address voltage coincidence indicators and also to indicate the availability of a single register for the entry of a unit of information therein. The latter operation is performed by connecting leads from each of the index storing units of the register to the coincidence sensing device and when all the units are at the voltage condition representative of zero, or no information being stored, the coincidence indicator is actuated.

It is an object of the present invention to provide a novel voltage coincidence sensing system.

It is a further object of the present invention to provide a simple and relatively inexpensive voltage coincidence sensing system.

It is still a further object of the present invention to provide a voltage coincidence sensing system which is adjustable.

These and other objects of my invention are achieved by utilizing two electron discharge tubes which have their cathodes connected together to a common cathode bias resistor. One of the tubes has an anode load resistor connected to its anode and output is derived from this anode. A rectifier is connected from the control grid of this tube to a point of reference potential in a manner to permit application of only negative potentials to the grid and to bypass any positive potentials. A rectifier is connected from the control grid of the other tube to the point of reference potential in a manner to permit application of only positive potentials to the grid and to bypass any negative potentials. Each of a plurality of input terminals is connected to the grid of the tube having the anode load resistor by a rectifier in a manner to apply only negative voltages to the grid. Each of the plurality of input terminals is connected to the grid of the other tube by a rectifier in a manner to apply only positive voltages to the grid. An output is derived from the coincidence indicator only when all the voltages applied to the input terminals are at zero potential.

The novel features of the invention as well as the invention itself, both as to its organization and method of operation, will best be understood from the following description, when read in connection with the accompanying drawing which shows a circuit diagram of an embodiment of my invention.

Two electron discharge devices 10, 20 each have their cathodes 16, 26 connected to a common cathode bias resistor 30. The anode 12 of the first tube is connected to a suitable source of operating potential. The anode of the second tube 22 is connected, through an anode load resistor 28, to the source of operating potential. Output is obtained from the second tube anode 22 and applied to an output terminal 32. A negative bias is applied to the cathode bias resistor 30 to place the tubes 10, 20 on the linear portion of their operating characteristic curves when they are conducting current and to make the cathodes of both tubes follow, more accurately, the variations in potential of the more positive grid.

A rectifier 33 has its cathode 34 connected to grid 14 of the first tube and its anode 36 connected to ground 38 or a point of reference potential. The anode 40 of a second rectifier 41 is connected to the grid 24 of the second tube and its cathode 42 connected to ground 38. A plurality of input terminals 44, 46, 48 to which are applied the signal voltages whose coincidence is to be determined, are each connected to the control grids of the first and second tubes by a pair 50, 52 of input rectifiers. The anode 54 of one, 52, of each pair of rectifiers 50, 52 is connected to the second tube control grid 24 and its cathode 56 is connected to one of the input terminals 44, 46, 48. The cathode 60 of the other 50, of each pair of rectifiers 50, 52 is connected to the first tube control grid 14 and its anode 62 is connected to one of the input terminals 44, 46, 48.

With these connections, the cathodes 16, 26 of either tube will tend to follow the potential of the more positive grid. Thus, if the grid 14 of the first tube 10 is made positive by a sufficient amount relative to the potential of the grid 24 of the second tube 20, the second tube is biased beyond cut-off so that no current flows through the anode load resistor 28. If the grids of both tubes are held at the same potential, or if the grid 24 of the second tube 20 is held positive relative to the potential of the grid 14 of the first tube 10, plate current will flow through the anode load resistor 28.

The first and second rectifiers 33, 41, are respectively connected to the first and second tube grids in such a manner that the grid of the first tube does not go negative with respect to the point of reference potential 38 and the grid of the second tube does not go positive with respect to ground 38. The pairs of rectifiers 50, 52 connecting the input terminals 44, 46, 48 to the grids of the first and second tubes insure that, of all the voltages applied to the input terminals, the grid 14 of the first tube 10 always assumes the potential of the most positive input with respect to ground, while the grid 24 of the second tube 20 will always assume the potential of the most negative input with respect to ground. This condition obtains regardless of to which of the inputs the positive and negative input voltages are applied.

The only set of input voltages to the input terminals which will cause current to flow through the second tube and thus provide an output indicating coincidence is when all the input voltages are zero. If any of the input voltages departs from zero (by a sufficient amount) in either direction, the second tube is cut off and no output is provided. Additional inputs can be provided as shown by the dotted connections to input 48.

Two resistors 54, 56 are respectively connected between the grid of the first tube and a negative bias supply and the grid of the second tube and a positive bias supply. In this manner a small current is continuously bled into the diode circuits at all times. This is not necessary if the coincidence circuit is to be used with slowly varying input voltages, but this is essential if the input voltages are rapidly varying quantities. This system always insures that at least one of the rectifiers connected to the grids of each tube is conducting and rapidly discharges the rectifier capacity.

Where indications of other than zero amplitude coincidence for the input voltages is required, a positive or negative bucking voltage as desired may be applied to each of the inputs 44, 46, 48 so that when the applied signal and bucking voltages are all equal the resultant applied voltage to the coincidence sensing device is zero and an output indication is supplied for subsequent utilization as desired. The same polarity or amplitude bucking voltages need not be applied to all of the inputs. They each may be made as different or even variable as desired to achieve a given purpose. The coincidence indicator will only function when the amplitude of the resultant voltage applied to each of the inputs is simultaneously zero. By applying to all of the inputs, voltages representative of the address of a unit of information in an information-handling machine register, the subsequent simultaneous application of querying address voltages which are inverted to oppose each of the address voltages, will provide an address coincidence indicating output when the querying address voltages nullify the address voltages. Indications of other than zero amplitude coincidence can also be attained by making the point of reference potential positive or negative the amount of voltage at which coincidence is desired. This range, however, is limited by the amount of B+ applied to the tube anodes.

From the foregoing description, it will be readily apparent that I have provided an improved simple and inexpensive system, or apparatus, for indicating or sensing the coincidence in amplitude of a plurality of voltages. Although but a single embodiment of my present invention has been shown and described, it should be apparent that many changes may be made in the particular embodiment herein disclosed, and that many other embodiments are possible, all within the spirit and scope of my invention. Therefore, I desire that the foregoing description shall be taken as illustrative and not as limiting.

What is claimed is:

1. An electronic coincidence system comprising a first and a second electron discharge tube each having an anode, cathode, and grid electrode, a cathode bias resistor to which the cathodes of said first and second tubes are connected, an anode load resistor connected to the anode of said second tube, a plurality of signal input terminals, means to pass signals of only one polarity connected between said signal input terminals and said first tube grid, means to pass signals of only the opposite polarity connected between said signal input terminals and said second tube grid and means to derive an output from said second tube anode when the signals existing simultaneously on said first and second tube grids have the same amplitude.

2. An electronic coincidence system comprising a first and a second electron discharge tube each having an anode, cathode and control grid electrode, a cathode bias resistor to which the cathodes of said first and second tubes are connected, an anode load resistor connected to the anode of said second tube, means connected to the grid of said first tube to bypass all voltages having a negative polarity, means connected to the grid of said second tube to bypass all voltages of positive polarity, a plurality of input terminals, a means connected between each of said input terminals and the grid of said first tube to pass only voltages having positive polarity, and a means connected between each of said input terminals and the grid of said second tube to pass only voltages having negative polarity whereby current flows through said second tube only when voltages applied to said input terminals are simultaneously zero.

3. An electronic coincidence system comprising a first and a second electron discharge tube each having an anode, cathode and grid electrode, a cathode bias resistor to which the cathodes of said first and second tubes are connected, an anode load resistor connected to the anode of said second tube, a point of reference potential, a first rectifier having its anode connected to said reference potential point and its cathode connected to said first tube grid, a second rectifier having its cathode connected to said reference potential point and its anode connected to said second tube grid, and a plurality of input signal applying circuits each circuit consisting of a first and a second input rectifier, the anode of said first input rectifier being connected to the cathode of said second input rectifier, the cathodes of all said first input rectifiers being connected to the grid of said first tube and the anodes of all said second input rectifiers being connected to the grid of said second tube.

4. A voltage coincidence system as recited in claim 3 wherein there is provided in addition means to apply a negative current bias to said rectifiers connected to said first tube grid and means to apply a positive current bias to said rectifiers connected to said second tube grid.

EDWIN A. GOLDBERG.

REFERENCES CITED

The following references are of record in the file of this patent:

UNITED STATES PATENTS

| Number | Name | Date |
|---|---|---|
| 2,484,352 | Miller et al. | Oct. 11, 1949 |
| 2,493,648 | Walton et al. | Jan. 3, 1950 |